United States Patent
Young

[15] 3,680,894
[45] Aug. 1, 1972

[54] JOINTS BETWEEN PIPES OF DIFFERENT DIAMETERS AND COUPLINGS AND GASKETS FOR THE SAME

[72] Inventor: John S. Young, Berkeley Heights, N.J.

[73] Assignee: Victaulic Company of America, South Plainfield, N.J.

[22] Filed: Oct. 30, 1970

[21] Appl. No.: 85,616

[52] U.S. Cl. ................285/112, 277/206, 285/177, 285/367
[51] Int. Cl. .............................................F16l 17/00
[58] Field of Search........28/111, 367, 112, 177, 233; 277/206

[56] References Cited

UNITED STATES PATENTS

| 1,701,326 | 2/1929 | Johnson | 285/112 X |
| 1,899,695 | 2/1933 | Johnson | 285/112 X |

FOREIGN PATENTS OR APPLICATIONS

| 92,964 | 6/1923 | Austria | 285/112 |
| 323,252 | 12/1929 | Great Britain | 285/112 |
| 207,900 | 10/1966 | Sweden | 285/112 |

*Primary Examiner*—Dave W. Arola
*Attorney*—Albert M. Parker

[57] ABSTRACT

A joint between the ends of two pipes of different diameter formed by clamp-type segmental coupling elements having legs ending in key sections engaging grooves in the surfaces of the pipes. The leg for engagement with the pipe of smaller diameter is longer than the other leg. A pressure responsive gasket seated within the housing has lips engaging the pipe surfaces and has members for preventing the longer of the gasket legs from unseating its lip in response to pressure differential between the interior and exterior of the pipe. An additional rib may be provided for closing the space between the pipe ends.

19 Claims, 15 Drawing Figures

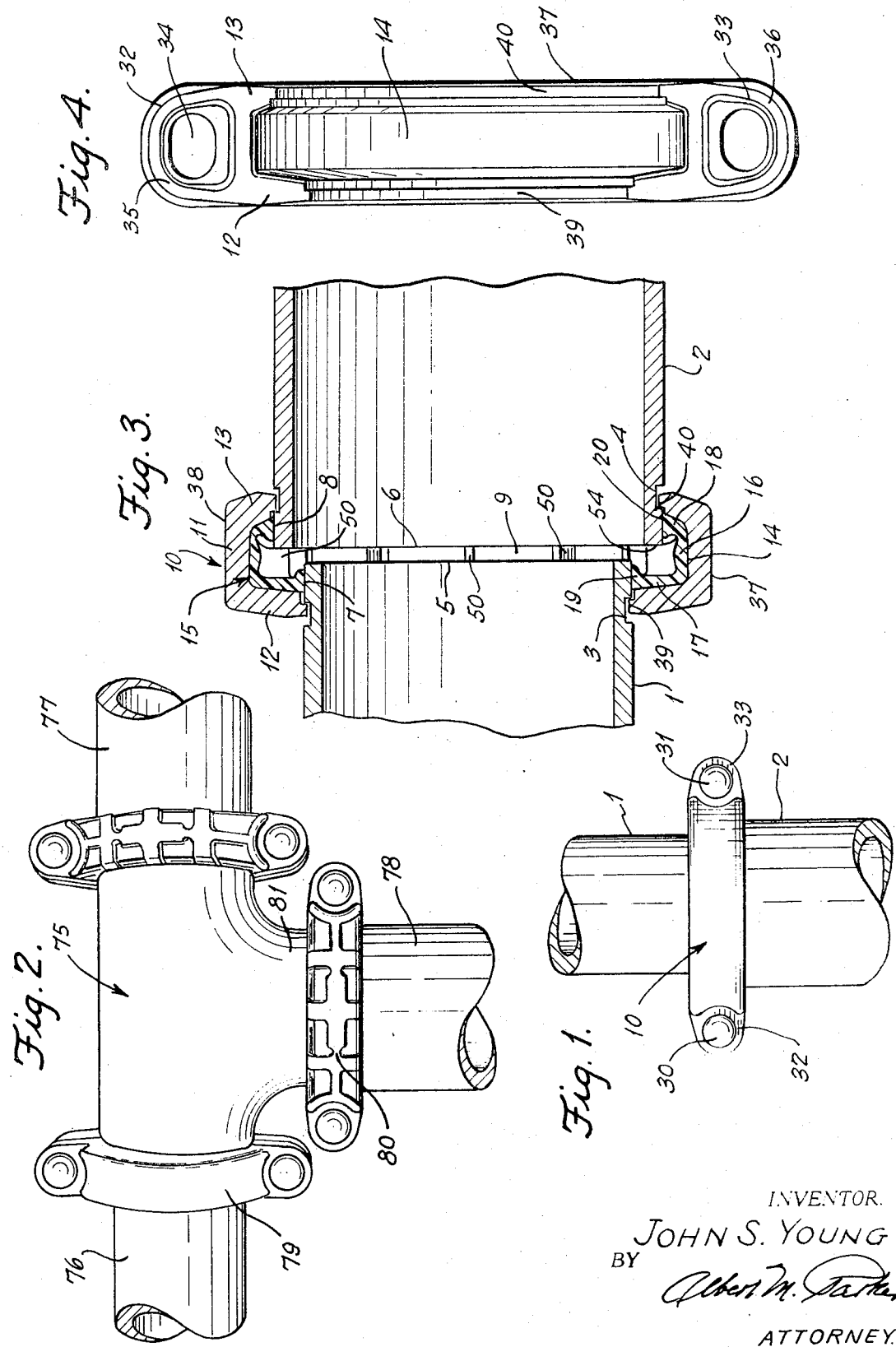

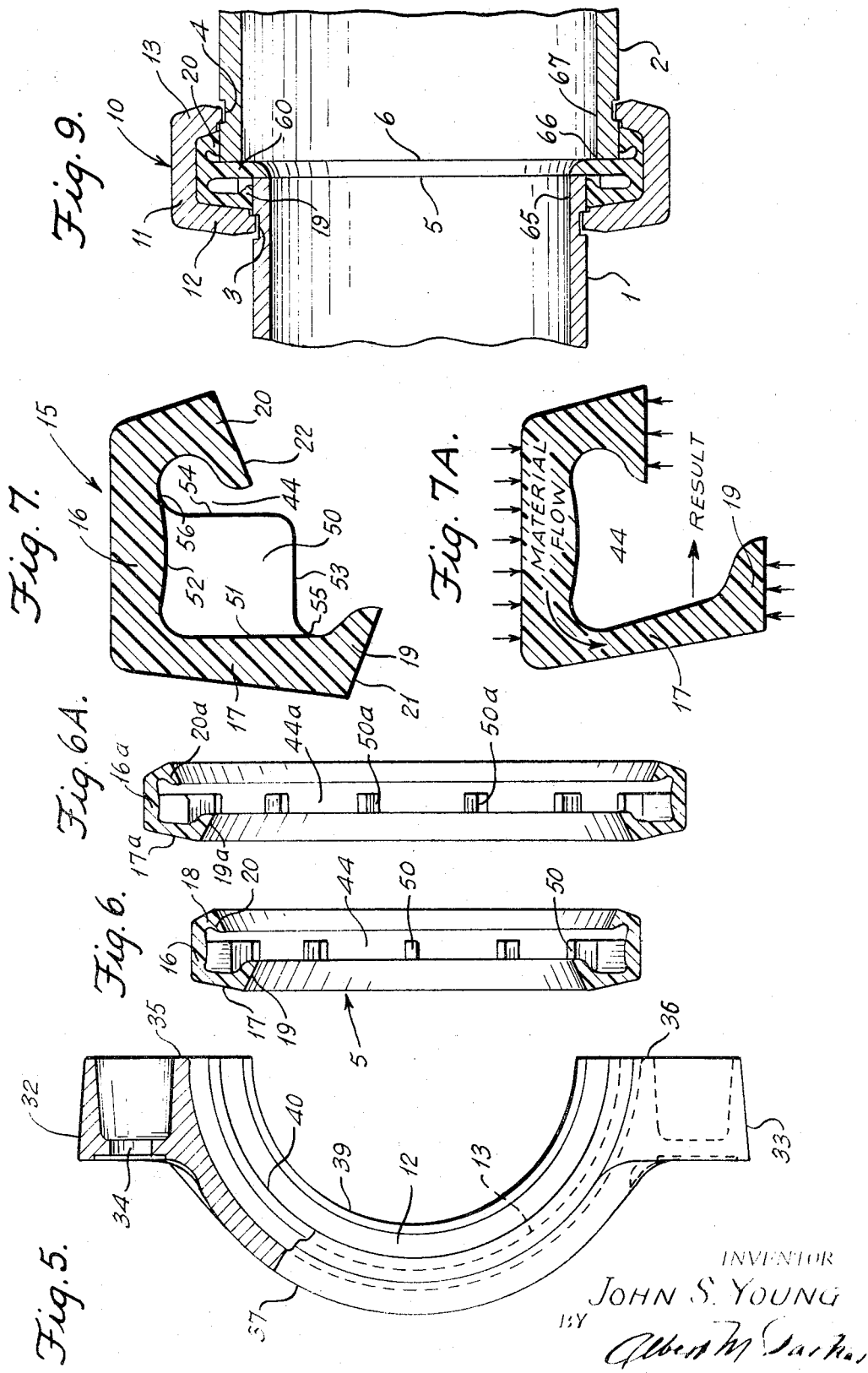

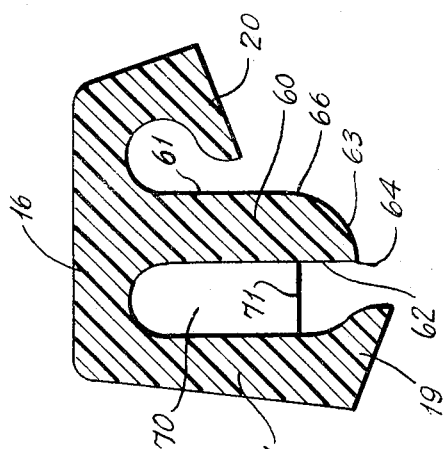
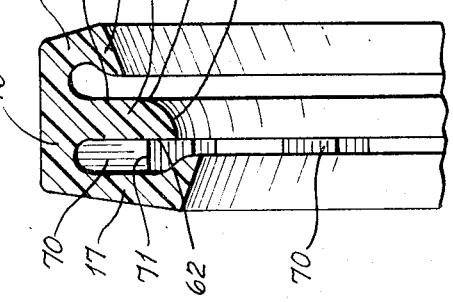
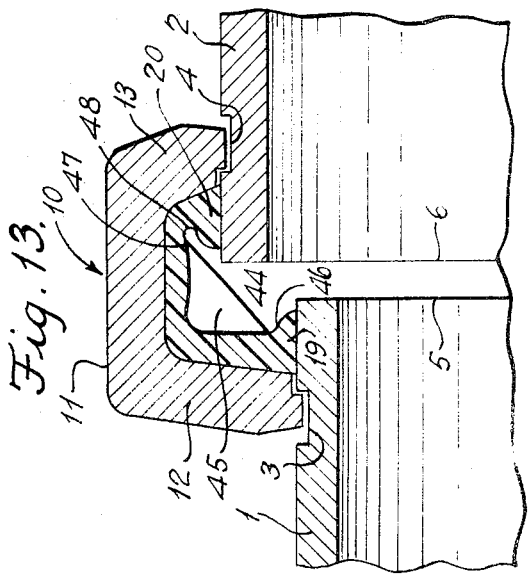
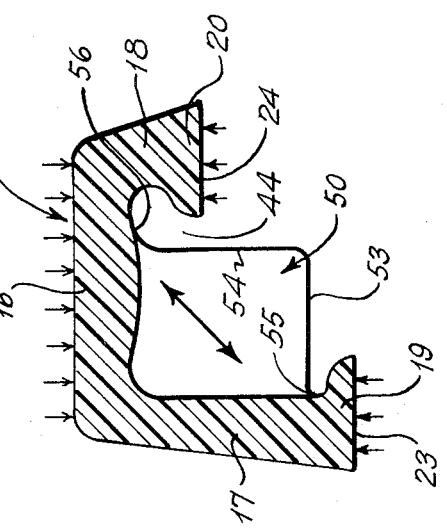
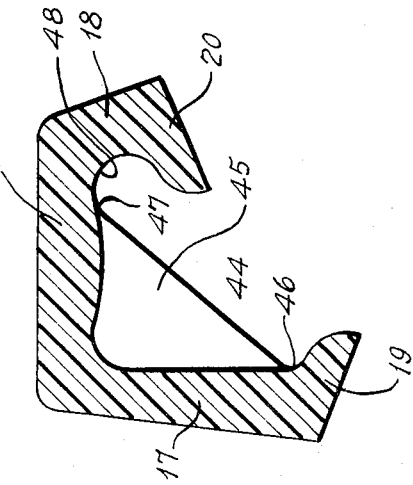
INVENTOR.
JOHN S. YOUNG
BY
ATTORNEY.

JOINTS BETWEEN PIPES OF DIFFERENT DIAMETERS AND COUPLINGS AND GASKETS FOR THE SAME

BACKGROUND OF THE INVENTION

1. Field of the Invention

The invention is in the field of readily applicable and removable clamp-type couplings for effecting joints between the ends of pipes. In particular, the invention is concerned with the making of such joints between pipes of different O.D. and with the joints including coupling segments clamped together and providing key sections for reception in grooves in the outer surfaces of the pipe. Pressure responsive gaskets are seated within the hollow of the couplings and have lips engaging surfaces adjacent the ends of the pipes.

2. Description of the Prior Art

Prior art efforts to make pressure tight joints between ends of pipe of different O.D.'s have usually involved the use of threaded adapters or more complicated constructions. The threading of the pipes and applying of threaded adapter is time consuming, cannot be done unless the pipes are to be in exact alignment, and creates a rigid joint. Another common practice is to insert the pipe of smaller diameter part way into the pipe of larger diameter when the dimensions allow this and then join the two together by means of flanges or other elements permanently affixed to the pipes. This again is time consuming, expensive, and results in a rigid joint.

SUMMARY OF THE INVENTION

The invention enables the quick coupling together of the ends of pipes of different diameters with couplings which are readily applied, creating joints which are strongly pressure resistant, whether the pressure be internal or external. The joints of the invention nevertheless allow a certain flexibility so that variations in pipe alignment to a moderate extent may be effected to satisfy the particular service for which a pipeline is being laid. The pipe ends do not overlap and are normally spaced a short distance longitudinally.

The invention employs annular couplings formed of segments of cylinders which are formed with bases and radially inwardly extending side rim portions, terminating in ribs, known in the trade as "key sections". The pipes have key section receiving grooves formed into them through their outer surfaces adjacent to, but spaced from, their ends. The rims are of different lengths with the longer one having its key section engaged with the receiving groove in the pipe of smaller diameter. The set back of the grooves from the ends of the pipe provides for gasket lip receiving surfaces between grooves and pipe ends. The pressure responsive gaskets, housed within the channel formed by the base and rims of the coupling, whose lips seat against the receiving surfaces on the pipe, have hollow interiors so that pressure within the pipe forces the lips down against those surfaces.

Like the coupling housings, the gaskets have bases and radially inwardly extending sides carrying the sealing lips, one of those sides being longer than the other. In the attempt to effect joints employing such gaskets with fully hollow interiors, it was found that as the coupling segments were tightened up to clamp them about the pipes the gaskets were distorted in such a way that the longer of the gasket sides moved longitudinally on its seat toward the pipe end and became unseated to sufficient extent to be ineffective.

In accordance with the invention it was found that if a few spaced transverse webs of the same material as, and preferably formed integrally with, the gasket extended from the longer of the gasket sides part way transversely across the hollow of the gasket without, however, engaging the shorter of the sides, this tendency of the longer side to distort so as to unseat its lip was overcome. One form of web was found to be effective to prevent distortion of the side and unseating of the lip as the gasket was seated on the pipes when the pipes were subjected to internal pressure only. Such web, however, did not supply the characteristics needed to keep the longer side from distorting so as to unseat its lip when the external pressure was greater than that within the pipes. A suitable web formation, however, was devised in accordance with the invention to take care of both of these situations as will be apparent as the description of the invention proceeds.

Alternately, a gasket was devised having a median rib for extending between and engaging the end faces of the pipes along with the advantages of the pressure responsive gasket just referred to.

Thus, within a moderate pipe diameter differential the invention provides a fully effective, simple, economical joint whether somewhat flexible, or rigid, as desired that can be made between the ends of pipes of different diameters. All that needs to be done to the pipes is to form standard grooves in their exterior surfaces. The gasket and coupling segments are seated in place on the pipes and the segments, whether two or more, making up the complete annulus, are either bolted together or clamped together in some recognized manner.

BRIEF DESCRIPTION OF THE DRAWING

In the accompanying drawing:

FIG. 1 is a plan view showing two sections of pipe of different diameter jointed together in alignment in accordance with the invention.

FIG. 2 is a similar view but showing the applicability of the invention to the joining of pipes of the same and different diameters to a Tee.

FIG. 3 is a vertical enlarged section through the joint of FIG. 1.

FIG. 4 is an interior elevational view of a hemicylindrical coupling housing element in accordance with the invention.

FIG. 5 is a side elevation viewing FIG. 4 from the right hand side thereof with a part broken away and shown in section.

FIG. 6 is an interior half elevation of a gasket of one size in accordance with the invention.

FIG. 6a is a similar view of a gasket of somewhat larger diameter.

FIG. 7 is a greatly enlarged transverse cross-sectional view of the gasket of FIG. 6, with the section taken just in advance of one of the gasket webs.

FIG. 7a is a cross-sectional view of a gasket having sides of different extents but devoid of any internal web and illustrating the manner in which the lip at the end of the longer side is moved inward to unseat itself as the gasket is clamped and distorted within a coupling housing.

FIG. 8 is a view similar to FIG. 7a showing the formation adopted by the invention gasket of FIG. 7 when a coupling housing is clamped over the gasket to seat it in position at a pipe joint.

FIG. 9 is a view similar to FIG. 3 of a modified joint in accordance with the invention employing a gasket carrying an intermediate rib.

FIG. 10 is a view somewhat enlarged, but otherwise similar to FIGS. 6 and 6a of the gasket employed in FIG. 9.

FIG. 11 is an enlarged transverse section of the gasket as shown in FIG. 10 with the section taken just in advance of the webs.

FIG. 12 is a view similar to FIG. 7 showing a gasket with a somewhat different form of web within it; and FIG. 13 is an enlarged view similar to one-half of FIG. 3 where the gasket of FIG. 12 is employed in the making up of the joint.

DESCRIPTION OF THE PREFERRED EMBODIMENTS

In FIGS. 1 and 3 a joint in accordance with the invention is illustrated as being made between sections of pipe 1 and 2 of different diameters. The pipes as here shown are of substantially the same wall thickness though the invention is by no means limited in this regard. The only limitation is to the difference in pipe O.D.'s which should preferably not be greater than two inches for effective coupling in accordance with the invention.

The sections of pipe 1 and 2 are shown as formed with external annular grooves 3 and 4 concentric with the cylinder of the pipe. These grooves are seen to be spaced from the respective ends 5 and 6 of the pipes by portions providing exterior surfaces 7 and 8 forming seats for the coupling gaskets. Before going further it is to be noted that the pipe ends 5 and 6 are spaced apart as shown at 9 which allows for flexibility of the joint. In other words, for angular movement of the axis of one of the pipe sections with respect to the axis of the other. This flexibility in no way disturbs the pressure tight seal between the pipe ends provided by the coupling of the invention.

The coupling member, generally indicated at 10, is here shown as being formed of an annular base portion 11 from the sides of which rims 12 and 13 extend radially inwardly and, as better shown in FIG. 4 provide an inwardly opening channel 14 for the reception of a pressure responsive gasket, generally indicated at 15. The preferred form of such which is shown in various positions and portions in FIGS. 3, 6, 7 and 8. The gasket 15 has an annular base portion 16 from the edges of which annular sides, or legs, 17 and 18 extend radially inwardly to terminate in generally laterally extending opposed lips 19 and 20.

As is apparent from the showings of the gasket 15 its side 17 is of greater extent than its side 18 in order to compensate for the difference in diameters between the pipes 1 and 2 with which the lips 19 and 20 are to be engaged.

Referring now to FIG. 7, which shows the gasket 15 in its relaxed state before being clamped in a coupling housing for engagement with the end surfaces of sections of pipes and to bridge the gap between the same, its lips 19 and 20 are inclined somewhat downwardly with respect to the central radical plane of the gasket.

Thus the bottom lip surfaces 21 and 22 shown in FIG. 7 as conical sections, must be moved up into cylindrical sections as shown at 23 and 24 in FIG. 8, in order for them to seat effectively upon the pipe surface sections 7 and 8 provided therefor.

The gasket 15 being formed of elastormeric material, normally a suitable synthetic rubber, is relatively incompressible so the action in moving the lips 19 and 20 from the open position as shown in FIG. 7 to the seated position as shown in FIGS. 3 and 8, is one of distorting the initial shape of the material, causing it to flow into a different form, rather than a compressing of it.

The manner in which the flow of the material is brought about will become apparent by referring back to FIGS. 1 and 3 where the coupling housing 10, usually of metal, is shown as being made up of two segments of a cylinder, one of which is shown per se in each of FIGS. 4 and 5 and which are shown as bolted together to form the complete cylinder by suitable bolts 30 and 31. These bolts pass through bolt pads 32 and 33 extending outwardly with respect to the cylindrical segments. The pads 32 and 33 have specially formed, oval shaped, bolt receiving openings 34 for reception of similarly shaped shanks on the bolts in order to prevent their rotation while nuts at the opposite ends thereof are tightened up. Also the size of the openings 34 with respect to the bolt shanks permits sufficient swinging movement of the bolts to enable them to properly seat themselves. The bolt pads 33 and 34 also have radially extending surfaces 35 and 36 which come substantially together as the clamping is completed by the tightening of the bolts.

In effecting a joint between pipe sections, such as shown at 1 and 2 in FIG. 3, the pipe ends are brought in to the necessary proximity, and into alignment, being slipped into the gasket 15 as this is done. Such action tends to materially move the lip surfaces 21 and 22 as shown in FIG. 7 up into the cylindrical position as shown at 23 and 24 in FIG. 8, but, at the outset, only moderately so inasmuch as the gaskets will not take their final form until confined, in all directions. The next step then is to bring the coupling housing segments, commonly two in number as shown at 37 and 38 in FIG. 3, into position over the gasket 15 which is then received within the channel 14 of the coupling housings. The housing segments would normally be first brought toward each other by hand and then as the key sections 39 and 40 carried by the housing rims 12 and 13 respectively are aligned with their receiving grooves 3 and 4 formed in the pipes, the nuts at the remote ends of the bolts 30 and 31 are tightened until the opposed bolt pad surfaces 35 and 36 on the coupling housing segments abut. The inside diameters of the coupling being somewhat larger than the pipe O.D. and the groove, and the key sections 39 and 40 being somewhat narrower than the width of the grooves 3 and 4, along with the fact that the gap 9 exists between the pipe ends, allows the joint to be flexible. If a rigid joint is required, the pipe grooving configuration can be changed to achieve this end.

It will be apparent that as the clamping action of the coupling housing progresses the gasket will be fully distorted by flow of its material from the FIG. 7 position into the position shown in FIG. 3, and in enlarged cross-section form in FIG. 8. It was found, however, that with a gasket having a completely hollow interior, as shown at 44 in FIG. 7a, the closing action of the housing segments, due to the flow of material tend to swing the longer gasket side 17 inwardly so that its lip 19 moved at least part way off the seat provided for it on the pipe. Accordingly the gasket failed to maintain a tight joint against either positive or negative pressure within the pipe. This was particularly true under negative pressure conditions.

To counteract the ineffective results achieved with a completely hollow gasket, as seen in FIG. 7a, and after considerable research work was done on the problem, diagonal webs were formed within the hollow of the gasket, as seen in FIGS. 12 and 13. The thickness, shape and spacing of the webs all had to be determined for effective results. As a non-limiting example it was determined that for a gasket to provide a tight joint between pipe sections of approximately 6½ and 5½ O.D. diagonal spaced webs integral with the gasket of one-quarter inch in thickness and at a spacing of 30° would be sufficient to overcome the tendency of the leg 17 to move inwardly as shown in FIG. 7a. To do this, however, it was found to be essential for the diagonal border of the webs to commence at the top of the radius 46 where the upper surface of the lip 19 joins the interior of the side 17 and to extend to and terminate at the position 47 where the curve 48 commences its extent from the interior of the base 16 of the gasket and extends around to top of the lip 20. Thus the webs meet the criteria of not interfering with the action of either sealing lip and remaining clear of the end 6 of the larger diameter pipe 2 as seen in FIG. 13.

The gasket with such a series of webs as in FIGS. 12 and 13 works admirably to overcome the condition illustrated in FIG. 7a and to maintain the longer side 17 and lip 19 of the gasket in position to make a tight joint as against positive pressure within the joined pipes. It was rather surprisingly found, however, that when the interior of the pipes was subjected to negative pressure the diagonal edge webs 45 became ineffective and the gasket again failed in the manner illustrated in FIG. 7a. However, such gasket has utility when used to seal against positive pressure in the pipe so to a worthwhile extent it solves at least part of the problem encountered in the use of gaskets entirely devoid of webs.

The preferred form of the invention, found to satisfy all conditions of assembly, positive and negative pressure, involves a new relationship between gasket and other features of the construction. The details of this are variously shown in FIGS. 3, 6, 6a, 7 and 8. The basic gasket construction, as already described, has a base 16 and sides 12 and 13 but in this instance a plurality of rectangular webs 50 formed integrally with the gasket extend from the inner surfaces of the side 17 and base 16 part way across the hollow 44 of the gasket. Hence the borders of the web rectangle are the sides 51 and 52 joined respectively to the gasket side 17 and base 16, and the two free sides, 53,54 extending at substantially right angles with respect to the side 17 and base 16. Like the diagonal edge web 45 previously described, however, the webs 50 are so proportioned and positioned that they do not interfere with the movement of the lips 19 and 20 as the bottom surfaces of those lips 21 and 22 are moved into the positions 23 and 24, (FIG. 8), in the tightening of the gasket in place within the coupling housings. Thus the bottom free edge 53 of the web 50 commences at the position 55 where the radius at the top surface of the lip 19 joins the inner surface of the side 17 while the side free edge 54 of the web 50 meets the inner surface of the base 16 at the position 56 where the curved interior of the side 18 meets the inner surface of the base 16 in a substantially flat portion. Thus it is apparent that the spaced webs 50 will in no way interfere with the movement of the elastomeric material of the sides 17 and 18 or of their lips 19 and 20 from the position of FIG. 7 to that of FIGS. 8 and 3. Likewise such webs will in no way interfere with the reaction of those lips to internal pressure within the pipe acting upon them.

The thickness and spacing of the webs 50 is important since too thick a web can cause rippling at the sealing lip while, if the web is not thick enough, it will tend to buckle rather than assist in the positioning of the long side 17 of the gasket against the interior of the housing and of its lip 19 against the pipe end as needed for proper sealing. As an example, it has been found that in a gasket for use in sealing the joint between standard pipes having O.D.'s of approximately 6.5 inches and approximately 5.5 inches the transverse webs 50 should be approximately one-quarter of an inch thick and should be spaced at 30° about the interior circumference of the gasket. Moderate variations from these factors may be adopted as will be apparent to those skilled in the art dependent on such factors as the size and hardness of the gasket.

For properly controlling the action of the gasket for use in joining pipes of larger O.D.'s the webs 50 could be somewhat smaller angle so as to effect the same gasket side control. An illustration of this is seen in the larger gasket shown in FIG. 6a where parts similar to those in gasket of FIG. 6 are given the same reference characters but with the suffix a. Here the showing is of a greater number of webs 50a since they are spaced at 25° apart instead of the 30° spacing of the webs of FIG. 6. In this way a thickening of the webs is hardly needed but may be effected if desired and if considerations, such as variation in gasket hardness, call for it.

The provision of the rectangular webs 50 and their cooperation with the end 6 of the larger pipe 2 solve all the problems of gasket seating and maintenance of gasket effectiveness whether subject to positive or negative pressure. In the first place, the provision of the webs alone serves to prevent unseating of the lip 19 as the material of the gasket is caused to flow while the coupling housings are clamped in place over the gaskets and their key sections are seated within the pipe groove. Secondly, and even more importantly, the web 50 prevents inward movement of the side 17 and unseating of the lip 19 in response to external pressure greater than that within the pipe. This is accomplished by the webs 50 being formed, as best seen in FIG. 3, to extend far enough across the hollow of the gasket so that the free vertical sides 54 of the webs come just into engagement with the end face 6 of the pipe section 2 as the joint is completed. This backing up of the webs supplies the resistance needed to protect the long side 17 of the gasket from being moved inward by the action of external pressure. Inward sliding of the lips 19 and consequent unseating of them laterally is prevented. Nevertheless the gasket hollow 44 is substantially maintained so that the lips 19 and 20 will respond to internal pressure and seal tightly against the pipe.

It is thus seen that the simple coupling of pipe sections of different diameters by the use of clamp type couplings to provide a tight seal at the joint, whether the pressure to be sealed against is external or internal, is fully provided by the invention.

An alternative form of gasket for use in effecting joints between pipes of different diameters is illustrated in FIGS. 9, 10, and 11. Here like parts to those in FIGS. 3–8 are given like reference characters, so the only additional description needs to be that of the parts changed and added. In particular, the gasket here shown has an intermediate radially inwardly extending center leg 60 having a width between its sides 61 and 62 the same as, or slightly greater than, the distance between the end faces 5 and 6 of the pipes 1 and 2 when the coupling housings have been brought home. This center leg 60 serves to close off the gap between the pipe ends but is needed more from the standpoint of smoothing out the fluid flow at the point where the diameter of the fluid path changes, than from the standpoint of sealing the joint. Such sealing is already effectively done by the action of the basic gasket of C-shaped cross section.

Smoothing out of the flow path is brought about particularly by the radiused nose 63 on the leg 60. In the first place, the extent of the leg is such that its innermost edge 64 aligns with the inner surface 65 of the pipe 1 (FIG. 9). From there the convex curve 63 extends outwardly in such a manner as to meet the straight side 61 of the leg at the position 66 where the leg 60 initially comes into contact with the inner surface 67 of the pipe section 2. Since the leg 60 and its curved end surface 63 are circumferential, a smooth, rounded transition surface is provided for the flow of fluid past the joint regardless of the direction of that flow.

In this instance there is a series of gasket webs 70 which extend integrally between the side wall 17 of the gasket and its center leg 60, bridging the space therebetween from the base 16 of the gaskets down to a bottom edge 71. This bottom edge 71 lies just above the position where the rounded to surface of the lip 19 merges with the inner side wall surface of the side wall 17 again leaving the lip 19 entirely free to perform its sealing function. Also the end face 6 of the pipe backs up the leg 60 in alignment with the lower portion of the web 70 as best seen in FIG. 9. Hence, as in FIGS. 3, 6 and 8 protection is provided against displacement of the leg 17 and the lip 19 as a result of external pressure on the joint.

FIG. 2 merely illustrates the application of the joints in accordance with the invention to a situation where a Tee, generally indicated at 75, has three pipe sections 76, 77 and 78 joined thereto. A joint 79 in accordance with the invention is effected by means of grooves and couplings as heretofore described where the pipe 76 is of one diameter and the Tee at this position is of the greater diameter. As shown at the other end of the Tee the pipe section 77 is of the same diameter as the adjacent end of the Tee 75, so a standard coupling with rims and gasket sides of the same length is all that is needed. The pipe 78, however, joined at the center of the Tee 75 by the coupling 80 has a greater diameter than the adjacent portion 81 of the Tee, so the reverse situation to the joint between the section 76 and the Tee 75 is present. Heretofore threaded reducers would have been needed to make the joints such as 79 and 80 with consequent greater expense of construction part preparation and application while eliminating the possibility of flexiblity at the joints.

It will be apparent to those skilled in this art that this invention can be practiced through various modifications other than the preferred and modified forms disclosed herein illustrative of the invention and the applicability of the same to the coupling of pipes of different diameters in a simple and economical manner. It is accordingly to be understood that since certain changes may be made in the parts and assemblies above disclosed without departing from the spirit or scope of the invention all matter contained in the above description or shown in the accompanying drawing shall be interpreted as illustrative and not in a binding sense.

Having described my invention what I claim as new and desire to secure by Letters Patent is:

1. A gasket for sealing the joint between aligned sections of pipe of different diameters, said gasket comprising a short cylinder C-shaped in cross section having a base portion and having side portions extending radially inwardly from said base portion at the longitudinal ends thereof forming a hollow within said gasket, one of said side portions having a greater radial extent than the other thereof, said sides terminating in oppositely inwardly extending lips and a plurality of thin transversely extending uniformly spaced webs within the hollow of said gasket, said webs extending integrally from the inner surface of the longer of said sides and the inner face of said base, all said webs being free from engagement with the shorter of said sides.

2. A gasket as in claim 1, said webs commencing at a position closely adjacent to but above the juncture of said longer side and the lip carried thereby and terminating at a position closely adjacent to but spaced inwardly from the position where said shorter side joins said base.

3. A gasket as in claim 1, said webs being of rectangular shape.

4. A gasket as in claim 3, said webs extending radially inwardly beyond the lip carried by the shorter of said sides.

5. A gasket as in claim 2, the outer edge of said gasket being on a diagonal line extending from said commencing position to said terminating position.

6. A gasket as in claim 1 and including a radially inwardly extending leg extending from the base of said gasket intermediate said sides, said webs terminating at the side of said leg opposite said longer side.

7. A gasket as in claim 6, said leg terminating in a convexly rounded face on the side thereof opposite said shorter side.

8. In clamp type couplings for forming a joint between pipes of different diameters, segmental coupling housings formed to make a complete cylinder when applied to pipes to be joined, each of said housing segments having a base portion and having radially inwardly extending rims at each side of said base portion, said rims forming with the interior of said base portion a gasket receiving channel, one of said rims having a greater radial extent than the other, the radial end faces of said rims being formed with key sections for engagement with grooves formed in the pipes to be joined, and a pressure responsive gasket formed for mated reception in said receiving channel, said gasket having a circumferential base portion and radially extending side portions extending therefrom forming a hollow therewithin, said side portions terminating in inwardly extending opposed lips for engagement with the surfaces of pipes to be joined, one of said side portions having a greater radial dimension than the other thereof in correspondence with the rim of greater radial extent, and transversely extending thin webs at spaced positions within the hollow of said gasket, said webs extending integrally from and connecting the inner surface of the longer of said sides with the inner surface of the base of said gasket, all said webs being free from engagement with the shorter of said side portions.

9. In couplings as in claim 8, said gasket webs extending from the longer of said sides at a position spaced above the lip carried by the same and continuing in spaced relationship with respect to said side portion of shorter radial extent.

10. In couplings as in claim 9, said gasket webs being rectangular in cross section, having a bottom edge substantially parallel to said base and a free side edge substantially parallel to the longer of said sides.

11. In couplings as in claim 8, said gasket including a radially inwardly extending leg positioned intermediate said sides and extending, when said gasket is confined by said housing, to a position radially inwardly of the key section of said rim of greater radial extent.

12. In couplings as in claim 11, said webs extending to and terminating at said leg.

13. In couplings as in claim 8, said webs having a free edge extending diagonally between the longer of said sides and the inner surface of said base.

14. A joint between pipes of different diameters which comprises, a pair of pipe sections positioned end to end, one having a greater diameter than the other, the end face of the larger diameter pipe being exposed radially outwardly of the end of the smaller diameter pipe, each of said pipe sections being formed with circumferential grooves therein adjacent, but spaced from, the end faces thereof leaving gasket engaging surfaces on the exteriors of said pipes between said grooves and said end faces, clamp type couplings surrounding said pipes, said couplings being generally C shaped in cross section, having a base portion with radially inwardly extending rims at the ends thereof, said rims terminating in key sections formed for reception in said pipe grooves, the rim at one longitudinal end of said coupling having a greater radial extent than the other of said rims for engagement of the key section carried by the same within the groove of the smaller diametered one of said pipes, a pressure responsive gasket generally C shaped in cross section received within said C shaped coupling housing, said gasket having a base portion with radially inwardly extending sides at the ends thereof providing a hollow therewithin, one of said sides of said gasket being longer than the other thereof, oppositely inwardly extending lips carried at the inner ends of said sides with the lip on the longer of said sides engaging the gasket surface of said pipe of smaller diameter, transversely extending web means within said hollow of said gasket positioned at uniformly spaced intervals around the circumference of said gasket, said web means being integrally secured to the inner face of the longer of said sides and the inner face of the base of said gasket, said webs serving to resist movement of said longer side toward said shorter side, all of said webs being free from engagement with said shorter side of said gasket.

15. A joint as in claim 14, said webs having an edge portion engaged with the end face of said larger diameter pipe.

16. A joint as in claim 14, said webs being rectangular in cross section, extending radially inwardly with respect to the lip carried by the shorter of said gasket sides, and having an edge face of said radially inwardly extending portion of said webs engaging said end face of said pipe of greater dimension.

17. A joint as in claim 14, said gasket including a radially inwardly extending leg, said leg extending into, filling the space between, and engaging the end faces of said pipe sections terminating at the inner surface of the smaller of said pipe sections.

18. A joint as in claim 17, the face of said leg extending from the inner surface of the larger of said pipes to the inner surface of the smaller of said pipes being on a convex curve.

19. A joint as in claim 17, said webs extending between said longer side of said gasket and the opposed face of said leg and extending radially to a position opposite the end face of said pipe section of larger diameter.

* * * * *